Sept. 8, 1970          A. J. DECZKY          3,527,097

TEMPERATURE MEASUREMENT SYSTEM FOR ROTARY KILNS

Filed July 26, 1967

United States Patent Office 3,527,097,
Patented Sept. 8, 1970

3,527,097
TEMPERATURE MEASUREMENT SYSTEM FOR ROTARY KILNS
Andor Jenoe Deczky, Arvida, Quebec, Canada, assignor, by mesne assignments, to Milletron Incorporated, Pittsburgh, Pa., a corporation of Pennsylvania
Filed July 26, 1967, Ser. No. 656,252
Int. Cl. G01j 5/02; G01k 1/14
U.S. Cl. 73—351
9 Claims

ABSTRACT OF THE DISCLOSURE

Sensing system for measuring the temperature of the charge inside a rotating kiln. A thermal window built into the kiln wall is associated with a pyro-optical device sighted on the window. The temperature measurement signal may be employed for controlling kiln operation.

---

The present invention relates to an arrangement for measuring the temperature of material undergoing heat treatment in rotary kilns.

The techniques most used for measurement of temperature of rotary kilns are pyro-optical measurement of the surface temperature of the charge or measurement by thermocouples set in the brick lining of the kiln. Both of these techniques have considerable disadvantages. The pyro-optical method is overly sensitive to presence of dust inside the kiln, which absorbs portions of the radiation and causes the pyrometer to read the dust temperature. In addition, the pyrometer is effected by the behavior of the flame front in the kiln. In consequence, the pyro-optical results simply cannot be relied upon as providing a true picture of the variations in charge temperature. Thermocouples disposed in the brick work of the rotating kiln have their own disadvantages. They are vulnerable to mechanical damage if they protrude above the brick face. Yet, if completely embedded in the brick work, they lack sensitivity to temperature fluctuations and can provide only a general picture of temperature distribution. In addition, there may be a considerable lag between the actual measurement and ultimate signal which results in an undesired integrating effect. Moreover, the variations in the contact resistivity of the slip ring connections through which the thermocouple E.M.F. is transmitted outside of the rotating kiln constitute a source of unpredictable, uncontrollable errors.

Still another problem is that, traditionally, the entire vicinity of the rotating kiln is laden with dust, causing problems in maintenance of the temperature sensing and the signal receiving equipment. A more facile technique for accurate measurement of the true temperature of the material in a rotating kiln would be highly desirable.

The object of this invention is to provide a mechanically and electrically reliable system for measuring the temperature of a rotating kiln. Other objects and advantages of the present invention will be apparent from the description which follows:

For further understanding of the present invention, reference is now made to the drawing wherein:

FIG. 1 diagrammatically illustrates the system of the present invention;

Figure 1:
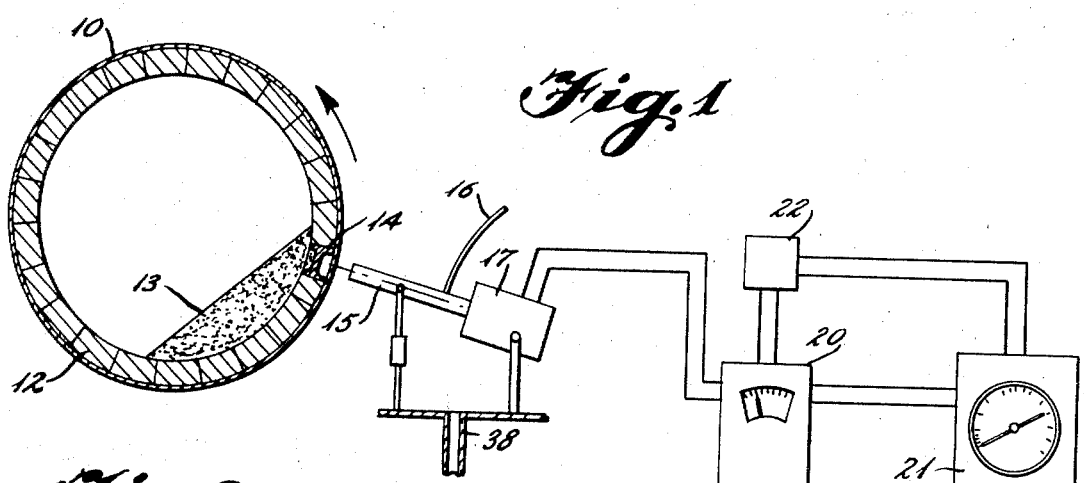
Figure 2:
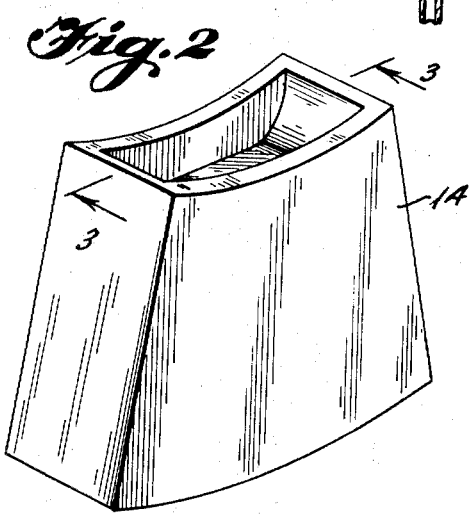
FIG. 2 is a perspective view of the radiant window insert.
Figure 3:
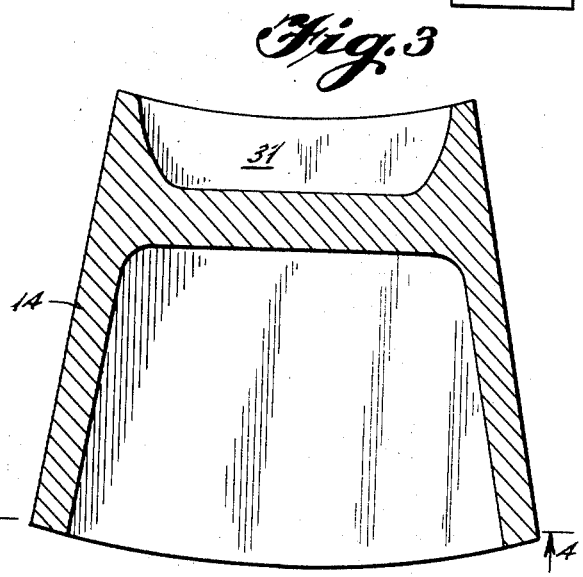
FIG. 3 is a section taken along lines 3—3 of FIG. 2.

Referring now to the drawing and in particular to FIG. 1 shown, there is a conventional rotary kiln 10 rotating in the direction shown by the arrow (counter-clockwise), causing the kiln charge 13 therein to assume approximately the position shown. The brick work present inside the kiln, shown at 12, has a radiant window 14 built thereinto generally as illustrated in FIG. 1. This construction causes radiant window 14 to assume the temperature level of the charge 13 by direct heat exchange contact therewith when kiln 10 is in the position shown in the drawing; in other positions, e.g., after the kiln has rotated a 180° the radiant window 14 takes the temperature level of the gases inside the kiln.

A photo electric scanner 17 sites through a shielding and sighting tube 15 to view radiant window 14 once every revolution of the kiln. In order to keep the sighting tube 15 and photo electric scanner 17 dust free, an air line 16 feeds clean air or inert gas into sighting tube 5. Electrically connected to photo electric scanner 17 are an indicator 20 and a recorder-controller 21. A timer 22 is incorporated to relate the photo cell or pyrometer reading only to the actual period that radiant window 14 is in view of scanner 17. This can be achieved by employing a form of timer responsive to the kiln rotation to activate the indicator 20 and recorder-controller 21 just prior to approach of the radiant window, or the timer may be responsive to the detector signal either before or from the indicator 20 to activate the recorder-controller to receive that signal. In passing, it may be noted that practice of the present invention expressly involves contemplation of employing recorder-controller 21 to control operation of kiln 10. Furthermore, a suitable amplifier can be incorporated, if necessary, to raise the detector signal to a suitable level.

Figure 4:
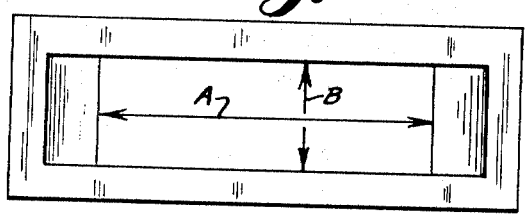
FIG. 4 is a view taken along line 4—4 of FIG. 3.

The construction of radiant window 14 is an important facet of the present invention. The material of construction should, of course, be appropriate to its purpose, being, for example, steel or of some high strength ceramic. the dimensions of the window 14 should, of course, correspond to the thickness and width of the brick work 12 inside the kiln, as is shown in FIG. 1 (so that it may be inserted into the brick work and the kiln wall readily). The longitudinal dimensions shown at A and B in FIG. 4 must be related to the field of view of the optical scanner 17. For example, the distance B may be twice the field of view of scanner 17. Distance A should be related to the speed of rotation of kiln 10 so that A will exceed the field of vision enough to allow for instrument lag. Radiant window 14 is provided with a relatively shallow cup depression 31 which allows part of kiln charge 13 to rest therein insuring good thermal contact between the radiant window 14 and the kiln charge 13 for best heat transfer.

Since the important thermal characteristic in the rotary kiln system is often the temperature attained by the charge 13 (in contrast, for example, to the temperature of the gases), it is most desirable to have radiant window 14 approach charge temperature as closely as possible. Certainly at a point in kiln rotation just before the charge 13 falls away from the window 14 thermal equilibrium between charge and window should be closest.

Accordingly, placement of the optical scanning system to view kiln 10 from the position shown in FIG. 1 provides for this maximum duration of direct contact between charge 13 and the radiant window 14. To repeat, temperature measurement is made just before continued rotation of kiln 10 in the direction shown by the arrow carries radiant window 14 up and away from the charge, causing the material inside the cup-like depression 31 to fall out therefrom.

Figure 5:
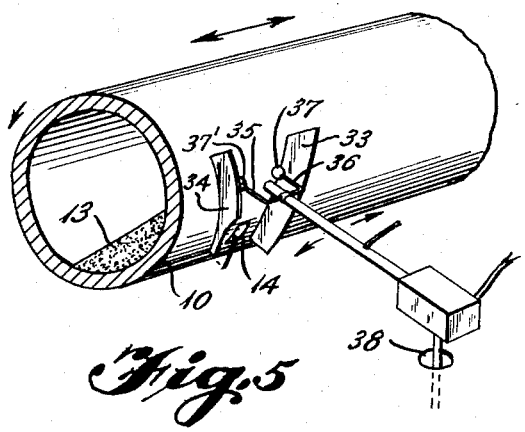
FIG. 5 is a partial perspective view illustrating the structural association of the various components of the system.

As a practical matter, even the best constructed kiln systems are subject to some axial or longitudinal shift of the kiln during operation, the effect of which can be sufficient to misalign a fixed scanner from sighting on radiant window 14. Accordingly, in a preferred embodiment of the present invention, illustrated in FIG. 5, provision is made for automatically guiding sight tube 15 to radiant window 14 by mounting the scanner 17 on swivel mount 38 so that it may oscillate over 10°–30° range, as necessary. Attached to the outside of rotary kiln 10 and in advance of the position of radiant window 14 are a pair of guide plates 33, 34 each angled toward the circumferential path traversed by the radiant window 14. A pair of guide fingers 35 and 36 are mounted at the forward end of sight tube 15. Desirably, guide fingers 35, 36 terminate in roller members 37, 37′, which come into contact with guide plates 33, 34 to swivel sight tube 15 into the desired viewing relation to radiant window 14 as it comes around into sight.

Individually, the optical and electrical components employed per se for the scanner 17, the timer 22, the indicator 20 and the recorder-controller 21 are commercial gear of a nature widely available, and form, as such, no part of the present invention (aside from the system as a whole). By way of specific example, it may then be noted that scanner 17 collects the radiation of the radiant window by a lens assembly and focuses it through an appropriate filter onto a photoconductive detector. A signal from the detector is fed to the indicator 20 and to the recorder-controller 21 under the control of the timer 22, as noted previously. Also, as indicated previously, the recorder-controller 21 can be employed to control the operation of the kiln, e.g. rotation rate, heating rate, charge residence, etc., all in accordance with a desired optimum charge temperature.

What is claimed is:

1. A temperature measuring system for a rotary kiln comprising a radiant window disposed in the kiln wall so as to be in good thermal communication with the kiln charge, a stationary electro-optical scanner sighted on the circumference of the kiln at the window location, whereby said window is viewed on every rotation of the kiln, and indicating means associated with said scanner for converting the scanned radiation signal into measurement of the temperature of said radiant window and thus of the temperature of the kiln charge, the radiant window having a cup-like depression therein adapted to house a portion of the kiln charge while the window is viewed by the scanner.

2. The apparatus of claim 1 wherein said scanner is positioned so as to sight on the window when kiln charge is in the most desired thermal contact therewith.

3. The apparatus of claim 1 wherein a sight tube open towards the kiln shields said scanner from extraneous radiation, and wherein a gas inlet feed means is provided on said sight tube to flow clean gas therethrough, whereby said scanner and sight tube are maintained free of dust.

4. The apparatus of claim 1 including means for swivel mounting said scanner including guide plates mounted on said kiln to cooperate with guide fingers associated with said scanner to swivel said scanner into sighting relation with the radiant window.

5. The apparatus of claim 4 wherein said guide fingers are mounted adjacent the kiln end of said sight tube.

6. A temperature measuring system for a rotary kiln comprising a radiant window disposed in the kiln wall so as to be in good thermal communication with the kiln charge, an electro-optical scanner sighted on the circumference of the kiln at the window location, whereby said window is viewed on every rotation of the kiln, indicating means associated with said scanner for converting the scanned radiation signal into measurement of the temperature of said radiant window and thus of the temperature of the kiln charge, and means for swivel mounting said scanner including guide plates mounted on said kiln to cooperate with guide fingers associated with said scanner to swivel said scanner into sighting relation with the radiant window.

7. The apparatus of claim 6, wherein said guide fingers are mounted adjacent the kiln end of said sight tube.

8. The apparatus of claim 6, wherein said scanner is positioned so as to sight on the window when the kiln charge is in the most desired thermal contact therein.

9. The apparatus of claim 6, wherein a sight tube open towards the kiln shields said scanner from extraneous radiation, and wherein a gas inlet feed means is provided on said sight tube to flow clean gas therethrough, whereby said scanner and sight tube are maintained free of dust.

References Cited
UNITED STATES PATENTS

| | | | |
|---|---|---|---|
| 1,232,408 | 7/1917 | Thwing | 73—355 |
| 3,101,618 | 8/1963 | Hance | 73—351 |
| 3,345,873 | 10/1967 | Lellep | 73—351 |

LOUIS R. PRINCE, Primary Examiner

D. E. CORR, Assistant Examiner

U.S. Cl. X.R.

73—355, 362.8